United States Patent [19]
Asai et al.

[11] Patent Number: 5,553,309
[45] Date of Patent: Sep. 3, 1996

[54] DEVICE FOR HIGH SPEED EVALUATION OF LOGICAL EXPRESSIONS AND HIGH SPEED VECTOR OPERATIONS

[75] Inventors: Kiyoshi Asai, Ibaraki; Takeshi Nishikawa; Yoshiki Seo, both of Tokyo, all of Japan

[73] Assignees: Japan Atomic Energy Research Institute; NEC Corporation, both of Tokyo, Japan

[21] Appl. No.: 465,902

[22] Filed: Jun. 6, 1995

Related U.S. Application Data

[63] Continuation of Ser. No. 972,020, Nov. 9, 1992, abandoned.

[30] Foreign Application Priority Data

Nov. 8, 1991 [JP] Japan .................................. 3-321165
Dec. 25, 1991 [JP] Japan .................................. 3-342780

[51] Int. Cl.[6] .......................... G06F 9/308; G06F 9/315; G06F 9/305
[52] U.S. Cl. .................................. 395/854; 364/DIG. 1; 364/DIG. 2; 395/869; 395/870; 395/800
[58] Field of Search .................................. 395/800, 650, 395/775, 725, 500, 375, 250, 275, 425, 550, 97, 84, 183.09, 869, 854, 870, 436, 483, 421.09, 182.01, 735, 742; 364/DIG. 1, DIG. 2, 133, 602

[56] References Cited

U.S. PATENT DOCUMENTS

| | | | |
|---|---|---|---|
| 4,490,786 | 12/1984 | Nakatani | 395/800 |
| 4,656,581 | 4/1987 | Ohwada | 395/800 |
| 4,852,049 | 7/1989 | Sakai | 395/375 |
| 4,881,168 | 11/1989 | Inagami | 395/800 |
| 4,903,228 | 2/1990 | Gregoire et al. | 395/375 |
| 5,109,523 | 4/1992 | Kanada et al. | 395/800 |

*Primary Examiner*—Daniel H. Pan
*Attorney, Agent, or Firm*—Foley & Lardner

[57] ABSTRACT

A logical expression operation device is embodied in hardware and is provided with an evaluation value operation means to operate logical expressions in vector data format and an evaluation value holding means to hold the operation result as intermediate evaluation values, and a control means which sequentially reads out the components of the logical expressions, judges the type of read component and controls the applicable means based on the judgment result and the status of the means to execute evaluation of said logical expressions with omitting the operation by the evaluation value operation means for a part in the logical expression corresponding to the secondary operated data of a particular operator. A vector operation device is provided with a data selecting means which reads out one of the vector data held at an input vector register and one of the data held at a mask register at a time and outputs the data as the first output data if the data from the mask register has a logical value "1" and as the second output data if the data from said mask register has a logical value "0". It is also provided with a first compress circuit which sequentially stores the first output data to the first output vector register and a second compress circuit which sequentially stores the second output data from said data selecting means to the second output vector register.

11 Claims, 10 Drawing Sheets

FIG. 8

```
J1 = J1 INIT
J2 = J2 INIT
DO10 I = 1 , N
    IF(M (I).GT.0) THEN
      J1 = J1 + 1
      B(J1) = A(I)
    ELSE
      J2 = J2 + 1
      C (J2) = A(I)
    ENDIF
10 CONTINUE
```

DEVICE FOR HIGH SPEED EVALUATION OF LOGICAL EXPRESSIONS AND HIGH SPEED VECTOR OPERATIONS

This is a continuation of application Ser. No. 07/972,020, filed Nov. 9, 1992, now abandoned.

BACKGROUNDS OF THE INVENTION

1. Field of the Invention

The present invention relates to an operation device used in an information processing device for evaluating logical expression and particularly relates to a logical expression evaluation device which makes logical expression evaluation with treating a logical expression comprising logical unit elements "0" and "1", OR operator and symbols for operation level specification "(" and ")" as vector data. The present invention also relates to a vector processing device used in a large scale information processing device adopting the vector operation method.

2. Description of the Prior Art

In a conventional particle model using atomic code, in general, a particle usually moves or remains in a complicatedly shaped space with inclusion relations of zones or cells combining basic shapes (primitives) such as spheres, cylinders, rectangular parallelepipeds and circular cones. Zones are numbered in advance and the particles in a certain zone have the number of that zone as their attribute.

When a particle moves in a space, the zone number of the particle can sometimes differ from the number of the zone where the particle is currently located. Such discrepancy may be possibly caused by contradiction in shapes defined by input data, accumulated errors arising in crossing calculation for particle paths and zone boundaries as well as logical error in programming the applicable code. Such particles causing discrepancy are referred to as lost particles, which are not to be subjected to calculation.

The MCNP code checks consistency every time a particle enters a new zone to find out lost particles.

A zone in MCNP code is defined by listed combinations of surrounding planes. Such a list expression is generated by an input processing routine using the input data. Whether a particle is in the correct zone or not is judged by checking that the positive and negative directions of the planes surrounding the particle have the same meaning as those in the input data. If they have the same meaning, the plane number in the input data is replaced with "1", and if not, it is replaced with "0" so that a zone list as above is prepared.

Such a zone list expression is evaluated as a logical expression according to the priority for Boolean operator and the obtained value is referred to as LGEVAL. If the LGEVAL value is "0", it means that the particle is in an inconsistent zone, or it is a lost particle.

The MCNP method is considered effective in finding input data error and preventing a program from running in an unexpected way during code development.

In conventional practices, logical expression evaluation as described above is processed by software. Besides, since a program for such evaluation has a structure with frequent conditional decisions and branching steps, scalar processing is usually used.

Thus, a logical expression is conventionally evaluated by scalar processing on software. Since it requires some hundreds of machine cycles to process even a single component in a logical expression, it takes long to evaluate an entire logical expression. This is a significant drawback which obstructs higher speed processing of atomic code for a particle model as described above.

On the other hand, a conventional vector operation device gives processing as shown below. Supposing an example where the behavior of a plurality of particles is simulated using Monte Carlo code (MCNP code), there may be many steps for particle classification processing using a program as shown in FIG. 8. Such a program is described in FORTRAN. This processing is to classify data A(I) to the array B and the array C depending on whether the array M(I) has a positive value or not for I values from 1 to N. Such particle classification was processed by mask and compress operations in a conventional vector processing device.

Referring to FIGS. 9 and 10, the flow of such processing is described below. FIGS. 9 and 10 are flowcharts to illustrate the conventional processing.

Mask generation 901

A logical expression M(I).GT.O as shown in FIG. 8 is evaluated with vector operation. The evaluation result ("1" for true and "0" for false) is stored in the mask register for every loop.

Compress (1) 902

Data A(I) on the input vector register 1 is checked to compress those having "1" at the corresponding location on the mask register so that they are stored in the output vector register (2). At the same time, the number of "1"s on the mask register determined by component number counting instruction is stored to the register. Then, this register value and J1INIT are summed and the result is stored at J1 memory location.

Storing (1) 903

The compressed data on the vector register are vector stored with using the above register value as the vector length and the memory address of B (J1INIT+1) as the initial memory location.

Mask reversing 904

All components on the above mask register are reversed ("1" is changed to "0", and "0" is changed to "1").

Compress (2) 905

Data A(I) on the input vector register 1 is checked to compress those having "1" at the corresponding location on the mask register and store them in the output vector register 2. The number of "1"s on the mask register determined by component number counting instruction is stored to the register. Then, this register value and J2INIT are summed and the result is stored at J2 memory location.

Storing (2) 906

The data on the vector register compressed in the compress process 2 are vector stored with using the register value obtained in the compress process 2 as the vector length and the memory address of C (J2INIT+1) as the initial memory location. However, if the vector length N excesses the maximum length that can be processed with vector operation, it is required to divide the data into a plurality of pieces so as to allow a procedure having a length below the maximum loop length to be repeated.

Thus, conventional vector processing as described above requires a mask reversing step, two compress steps and two component number counting steps. Such inefficient vector processing is a drawback. Such inefficiency is a drawback obstructing higher speed processing.

SUMMARY OF THE INVENTION

A first object of the present invention is to provide a logical expression evaluation device which enables high speed evaluation of logical expression.

A second object of the present invention is to provide a logical expression evaluation device which can divide a logical expression having a length exceeding the maximum vector length into a plurality of pieces for evaluation.

A third object of the present invention is to provide a vector operation device which enables extremely high speed vector data operation.

According to a preferred embodiment of the present invention to attain the first object, a logical expression evaluation device comprises a logical expression storage unit to store logical expression in vector data format, an evaluation value operation unit to process intermediate evaluation value of the logical expression and a logical unit element as a component of the logical expression, an evaluation value holding unit to hold the operation result obtained by the evaluation value operation unit as intermediate evaluation value of the logical expression, an operation level counting unit to count the nesting depth of the logical expression under evaluation, a skip status holding unit to set the part of the logical expression which corresponds to the secondary operated data of a particular operator in the logical expression to the status for skipping, a skip level counting unit to count the nesting depth of the logical expression in the status for skipping, and a control unit which sequentially reads out the components of the logical expression, judges the type of read component and controls the applicable units based on the judgment result and the status of the various units to execute evaluation of the logical expression with omitting the operation by the evaluation value operation unit for the part in the logical expression corresponding to the secondary operated data of the particular operator.

According to another preferred embodiment of the present invention to attain the second object above, a logical expression evaluation device further comprises an intermediate status storage unit which stores, upon completion of evaluation for a certain part of the logical expression, the intermediate evaluation value of the logical expression held at the evaluation value holding unit, operation level information at the operation level counting unit, skip status information at the skip status holding unit and skip level information at the skip level counting unit to the logical expression storage unit and an intermediate status setting unit which, when resuming the evaluation, reads out the intermediate evaluation value on the way, operation level information, skip status information and skip level information and sets them to the evaluation value holding unit, the operation level counting unit, the skip status holding unit and the skip level counting unit.

According to still another embodiment of the present invention, the control unit further comprises a section to hold criteria data used in type judgment for component of the logical expression and a section to compare the read out component of the logical expression with the criteria data for judgment. The section to hold criteria data in the control unit sets arbitrary criteria data through scan path or using software instruction.

According to further preferred embodiment of the present invention, the control unit outputs, when the skip status holding unit has skip information indicating non-skipping, a control signal to cause the operation by the evaluation value operation unit and its result to be stored to the evaluation value holding unit for a case where the read out component of the logical expression is a logical unit element "0" or "1", a control signal to set the intermediate value of the evaluation value holding unit to "1" if the intermediate evaluation value is "0" for a case where the component of the logical expression is an OR operator, a control signal to increment or decrement the count at the operation level counting unit for a case where the component of the logical expression indicates a logical level, and a control signal to set the skip information at the skip status holding unit and increment the count at the skip level counting unit if the intermediate evaluation value at the evaluation value holding unit is "0", and, when the skip status holding unit has skip information indicating skipping, a control signal to increment or decrement the count at the skip level counting unit for a case where the component of the logical expression indicates a logical level, a control signal to decrement the count at the operation level counting unit if the skip level at the skip level counting unit is not "0", and a control signal to set the information at the skip status holding unit to the status for non-skipping if the count at the operation level counting unit is not "0".

According to a preferred embodiment of the present invention to attain the third object, a vector operation device comprises an input data storing unit to hold vector data as input operand data, a mask data storing circuit to control vector operation for the vector data, a data selecting unit which reads out one of the vector data held at the input vector data storing unit and one of the data held at the mask data storing unit at a time and outputs the data as the first output data if the data from the mask data storing unit has a logical value "1", and as the second output data if the data from the mask data storing unit has a logical value "0", a first output data storing unit to hold the first output data, a second output data storing unit to hold the second output data, a first compress circuit which receives the first output data from the data selecting circuit and sequentially stores the first output data to the first output data storing unit, and a second compress circuit which receives the second output data from the data selecting circuit and sequentially stores the second output data to the second output data storing unit.

According to a further preferred embodiment, the first and second compress circuits are provided with data location counters to determine location for writing of the first and the second output data to the first and the second output data storing units. Further, the data location counters of the first and the second compress circuits increments the data writing location by one each time it receives the first and the second output data from the data selection circuit.

According to a still another embodiment, a vector operation device further comprises a first counting unit which counts how many times the data at the mask data storing unit is "1" and a second counting unit which counts how many times the data at the mask data storing unit is "0". In addition, it further comprises a first storing unit to store the count value of the first counting unit and a second storing unit to store the count value of the second counting unit.

According to a further preferred embodiment of the present invention to attain the third object above, a vector operation device comprises an input data storing unit to hold vector data as input operand data, a mask data storing unit to control vector operation for the vector data, a data selecting circuit which reads out one of the vector data held at the input vector data storing unit and one of the data held at the mask data storing unit at a time and outputs the data as the first output data if the data from the mask data storing unit has a logical value "1", and as the second output data if the data from the mask data storing unit has a logical value "0", a first output data storing unit to hold the first output data, a second output data storing unit to hold the second output data, a first compress circuit which receives the first output data from the data selecting circuit and sequentially stores the first output data to the first output data storing unit, a second compress circuit which receives the second output data from the data selecting circuit and sequentially stores the second output data to the second output data storing unit, a section provided at the first and second compress circuit to count location for writing of the first and the second output data to the first and the second output data storing units, a first counter which counts how many times the data at the mask data storing means is "1", a second counter which counts how many times the data at the mask data storing unit is "0", a first storing unit to store the count value of the first counter and a second storing unit to store the count value of the second counter.

BRIEF DESCRIPTION OF THE DRAWINGS

FIG. 8 is a program diagram for an example of processing;

DESCRIPTION OF THE PREFERRED EMBODIMENT

Figure 1:
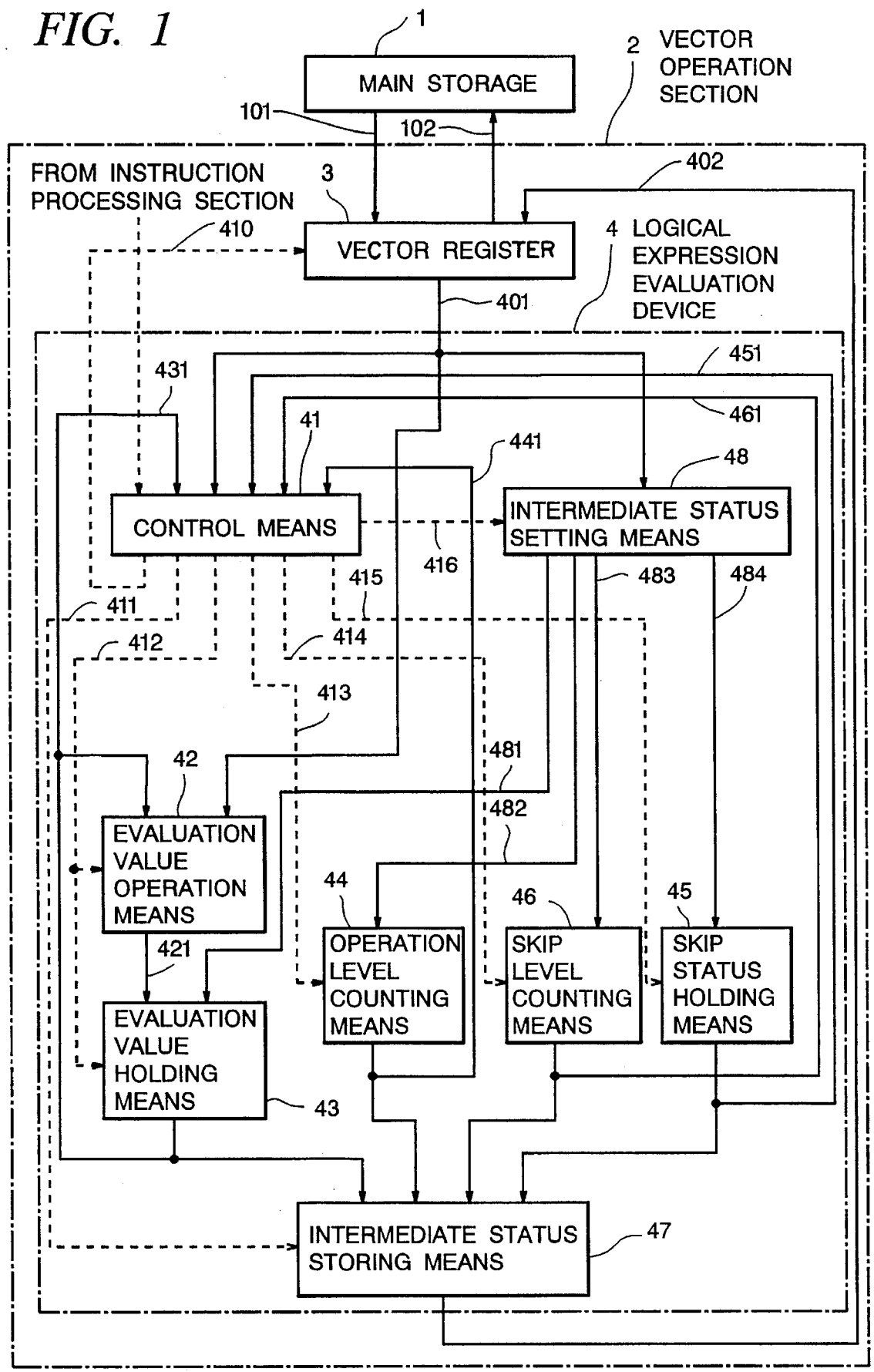
FIG. 1 is a block diagram to show the hardware configuration of an information processing device as an embodiment of a logical expression evaluation device according to the present invention.

Referring to the attached figures, preferred embodiments of a logical expression evaluating device according to the present invention will be described. FIG. 1 is a block diagram to show the configuration of an information processing device provided with a device for evaluating logical expression according to the present invention.

Referring to FIG. 1, an information processing device to which the present invention is applied comprises a main storage 10 and a vector operation section 20.

The main storage 10 stores programs to operate the vector operation section 20 and other data required for processing. In this embodiment, it stores the logical expression to be evaluated in vector data format.

The vector operation section 20 is provided with a vector register 30 and a logical expression evaluation device 40 and further comprises conventional vector operation unit such as adders and multipliers (not shown).

The vector register 30 stores vector data and is connected to the main storage 10 with a load line 101 and a store line 102.

The logical expression evaluation device 40 is the main part of the present invention. It receives the components of the logical expression to be evaluated from the vector register 30 via a data line 401 for evaluation. The result or intermediate evaluation status is stored to the vector register 30 via a data line 402.

The logical expression evaluation device 40 is embodied in hardware and comprises a control unit 41, an evaluation value operation unit 42, an evaluation value holding unit 43, an operation level counting unit 44, a skip status holding unit 45, a skip level counting unit 46, an intermediate status storing unit 47 and an intermediate status setting unit 48.

The evaluation value operation unit 42 is controlled by the control signal given from the control unit 41 via a control line 412. It executes operation using the intermediate evaluation value output from the evaluation value holding unit 43 to a data line 431 and the logical unit element read out of the vector register 30 to the data line 401. The result of operation by the evaluation value operation unit 42 is output to a data line 421.

The evaluation value holding unit 43 is controlled by the control signal given from the control unit 41 via the control line 412. It holds the intermediate evaluation value for the logical expression under evaluation by storing the result of operation output to the data line 421. The intermediate evaluation value held at the evaluation value holding unit 43 is output to the data line 431.

The operation level counting unit 44 is controlled by the control signal output from the control unit 41 to a control line 413. It counts the nesting depth (operation level) of the logical expression under evaluation. The operation level information obtained by the operation level counting unit 44 is output to a data line 441.

The skip status holding unit 45 is controlled by the control signal output form the control unit 41 to a control line 415. It holds the skip status indicating whether the applicable component of the logical expression is to be skipped or not.

The skip level counting unit 46 is controlled by the control signal given by the control unit 41 via a control line 414. It counts the nesting depth (skip level) of the logical expression being skipped. The skip level information, which is the count at this unit, is output to a data line 461.

The control unit 41 sequentially reads out the components of the logical expression stored in the vector register 30 in the vector data format. Based on the result of type judgment for each of read components, intermediate evaluation value input via the data line 431, operation level information input via the data line 441, skip status information input via a data line 451 and skip level information input via the data line 461, it executes controls required for continuous evaluation of logical expression with skipping the parts corresponding to the secondary operated data for the operator, which need not to be actually operated.

The control unit 41 receives as input information the data given by the data lines 401, 431, 441, 451 and 461 and the control signals from an instruction processing section (not shown) and supplies the control signals to the applicable components as described above via control lines 410 to 416.

Figure 2:
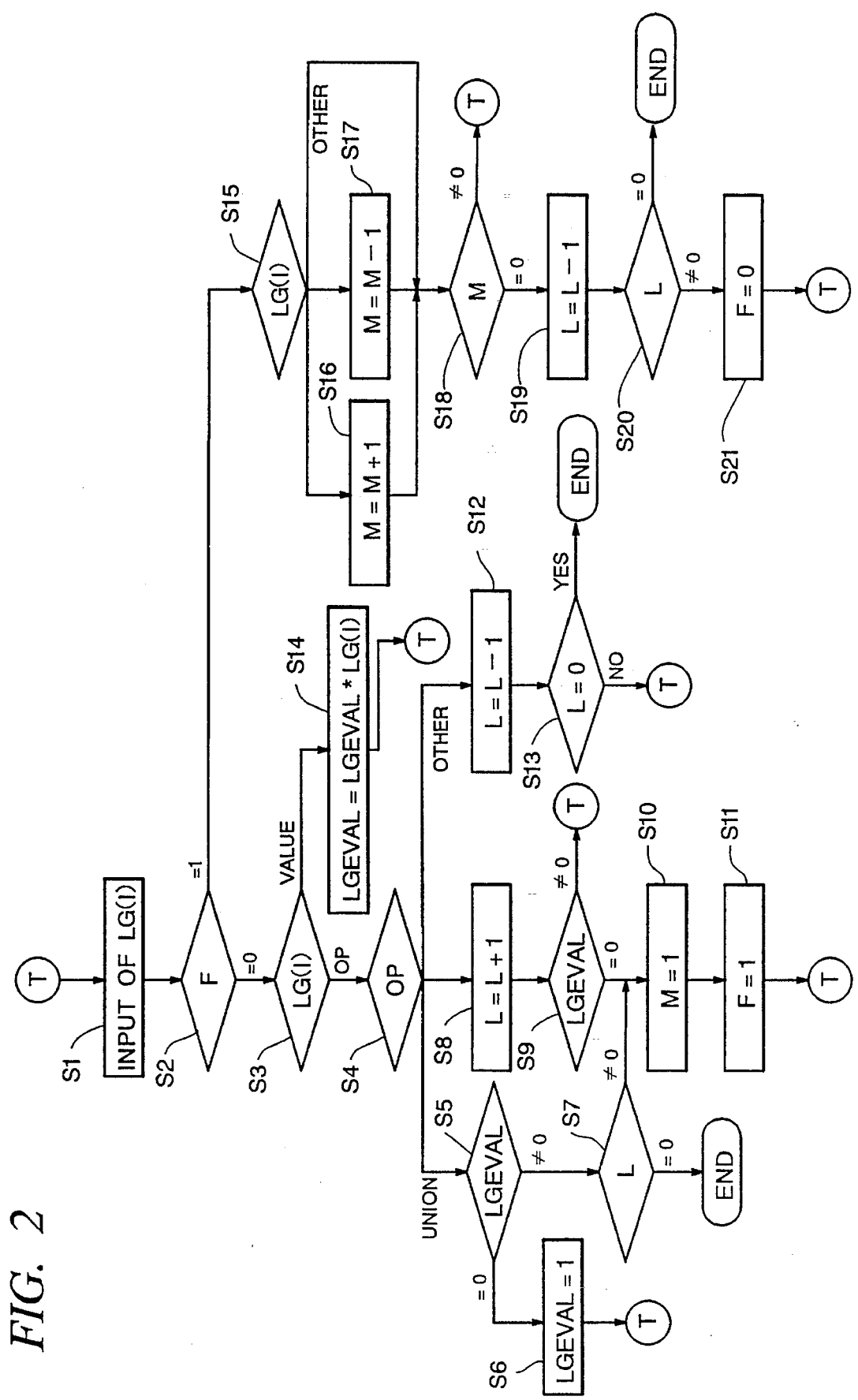
FIG. 2 is a flowchart to show the contents of evaluation control by the logical expression evaluation device.

FIG. 2 is a flowchart to show an example of control by the control unit 41. The controlling function of the control unit 41 is described below referring FIG. 2.

The logical expression treated in this embodiment comprises logical unit elements "1" and "0", an OR operator "∨", as well as opening and closing parentheses "(" and ")" for operation level specification. AND operators are omitted.

At the start of a machine cycle, the control unit 41 uses the control signal on the control line 410 to read one of the components in the logical expression from the vector register 3 via the data line 401 (Step S1). The firstly read component is referred to as LG(I) here.

Then, the value F indicating the skip status, which is output to the data line 451 from the skip status holding unit 45, is checked (Step S2). The system proceeds to Step S3 if this skip status value F indicates non-skipping status (F="0"), and to Step S15 for skipping if the skip status value F indicates skipping (F="1").

In Step S3, the input component LG(I) of logical expression is checked to see whether it is a logical element value ("0" or "1") or an operator (OR operator or other operation level specifying operator such as "("). If it is "0" or "1", the evaluation value operation unit ANDs the component LG(I) ("1" or "0") on the data line 401 and the evaluation value LGEVAL on the data line 431 according to the control signal on the control line 412 and the result is held at the evaluation value holding unit 43 as a new evaluation value LGEVAL (Step S14). This completes the operation for a machine cycle and the system proceeds to the next component processing.

If the component LG(I) is judged to be an operator in Step S3, it is further checked to see its type in the following Step S4. The system proceeds to Step S5 if it is an OR operator "v" (UNION), to Step S8 if it is "(", and to Step S12 for other operator, or ")". These checks of component and its type are executed by the control unit 41.

In Step S5, the current evaluation value LGEVAL output on the data line 431 is checked. If the value is "0", the evaluation value LGEVAL at the evaluation value holding unit 43 is set to "1" by the control signal on the control line 412 (Step 206). Then, the system proceeds to the next component.

If the current evaluation value LGEVAL is "1" instead of "0", the system checks the value for the operation level L output from the operation level counting unit 44 to the data line 441 (Step S7), and terminates the logical expression evaluation if L="0". If L is not equal to "0", since the current evaluation value LGEVAL is "1" and this operator is an OR operator v, the result is always "1" whether the secondary operated data of this OR operator v is "1" or "0". This operation can be skipped. In order to move to "skipping" status, the system sets the skip level M at the skip level counting unit 46 and the skip status value F at the skip status holding unit 45 to "1" using the control signals on the control lines 414 and 415 (Steps S10 and S11) and proceeds to the next component.

In Step 208, the operation level L at the operation level counting unit 44 is increased by one using the control signal on the control line 413. The evaluation value LGEVAL at the time is checked (Step S9). If LGEVAL is not 0, or "1", then the system proceeds to processing of the next component. If LGEVAL is "0", the operation result of the AND operator omitted immediately before this component "(" is always "0" whether the secondary operated data is "1" or "0". To go to the status for skipping, the system sets the skip level M at the skip level counting unit 46 and the skip status value F at the skip status holding unit 45 to "1" by the control signals 414 and 415 on the control lines 414 and 415 (Steps S10 and S11), and proceeds to processing of the next component.

In Step S12, the operation level L at the operation level counting unit is decreased by one by the control signal on the control line 413. If the procedure is not to be terminated (NO at Step S13), then the system proceeds to processing of the next component.

If, in Step S2, the skip status value F shows "1" or indicates skipping and causes the system to proceed to Step S15, the type of this component LG(I) is further judged. If LG(I) is "(", the skip level M at the skip level counting unit 46 is increased by one using the control signal on the control line 414 (Step S16). If LG(I) is "0", then the skip level is decreased by one (Step S17). If LG(I) is of any other type, the skip level is kept unchanged. Then, the system proceeds to Step S18.

In Step S18, the value for the skip level M output on the data line 461 is checked. If M is not 0, the system proceeds to processing of the next component. If M=0, it unit that skipping is completed. In this case, the operation level L at the operation level counting unit 44 is decreased by one by the control signal on the control line 413 (Step S19). Then, the value for the operation level L is judged (Step S20) and if L=0, the system terminates processing. On the other hand, if L is not 0, the skip status value F at the skip status holding unit 45 is set to "0" by the control signal on the control line 415 (Step 221), and the system proceeds to processing of the next component.

Referring again to FIG. 1, the intermediate status storing unit 47 and the intermediate status setting unit 48 are described now.

If the length of the logical expression being evaluated exceeds the maximum vector length of the vector register 30, the entire logical expression cannot be evaluated at a time and the logical expression needs to be divided into pieces within the maximum vector length for sequential evaluation.

If, during such logical expression evaluation, other process in operation with time slice uses the logical expression evaluation device 40, this will cause a problem. Suppose a new process uses the device at a timing where evaluation for certain parts is completed but another part with the maximum vector length is not yet loaded from the main storage 10 to the vector register 30 for starting evaluation of the partial logical expression. The intermediate status of logical expression evaluation in the old process will be damaged if the logical expression evaluation device 40 is passed to the new process without doing anything.

The intermediate status storing unit 47 shown in FIG. 1 is to prevent such intermediate status of logical expression evaluation from being damaged in a situation as described above. Upon completion of evaluation of a partial logical expression loaded to the vector register 30, it stores, via the data line 402, the operation level L at the operation level counting unit 44, the skip status F at the skip holding unit 45 and the skip level M at the skip level counting unit 46 together with the evaluation value LGEVAL for the logical expression held at the evaluation value holding unit 43 to the vector register 30 specified by instruction according to the control signal output from the control unit 41 to the control line 411. It is needless to say that the evaluation value LGEVAL at the evaluation value holding unit 43 when evaluation of the entire logical expression is completed is not an intermediate value (value on the way of evaluation) but the final evaluation value of the logical expression.

Before resuming evaluation using the intermediate status stored in the vector register 30 by the intermediate status storing unit 47, the intermediate status setting unit 48 reads the logical expression evaluation value LGEVAL on the way, the operation level L, the skip status F and the skip level M as described above from the vector register 30 via the data line 401 using the control signal from the control unit 41 on the control line 416. Then, the logical expression evaluation value LGEVAL on the way is set to the evaluation value holding unit 43 via the data line 481, the operation level L to the operation level counting unit 44 via the data line 482, the skip status value F to the skip status holding unit 45 via the data line 484, and the skip level M to the skip level counting unit 46 via the data line 483. Provision of the intermediate status setting unit 48 and the intermediate status storing unit 47 as above enables processing of logical expression over the maximum vector length of the vector register 30 by dividing it into a plurality of parts.

Figure 3A:
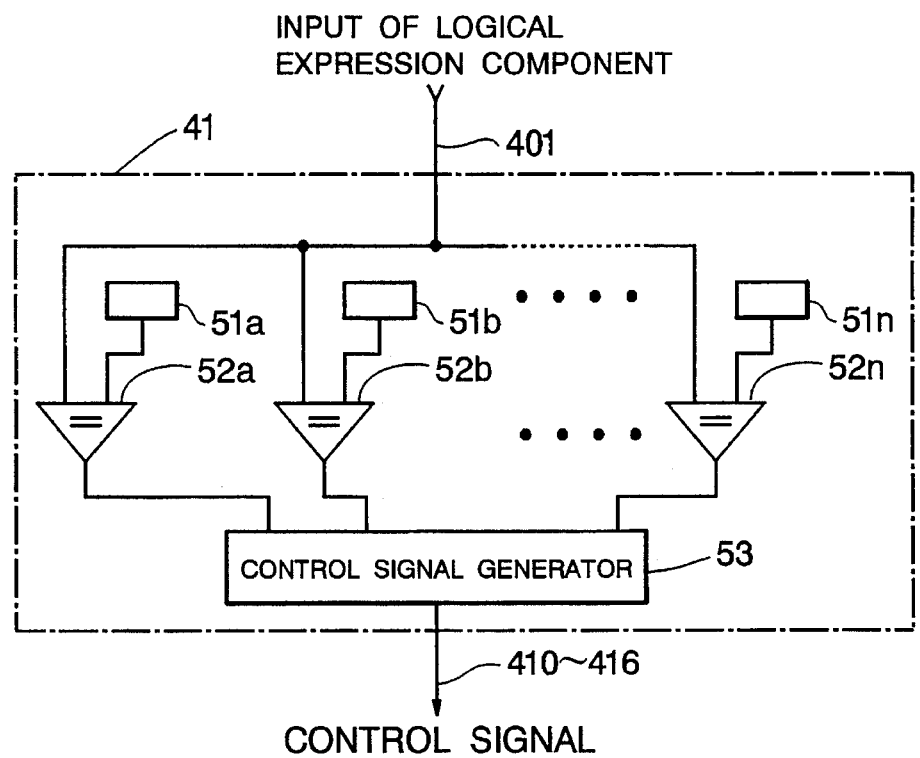
FIG. 3A and 3B are block diagrams to show a hardware configuration example for a control unit.
Figure 3B:
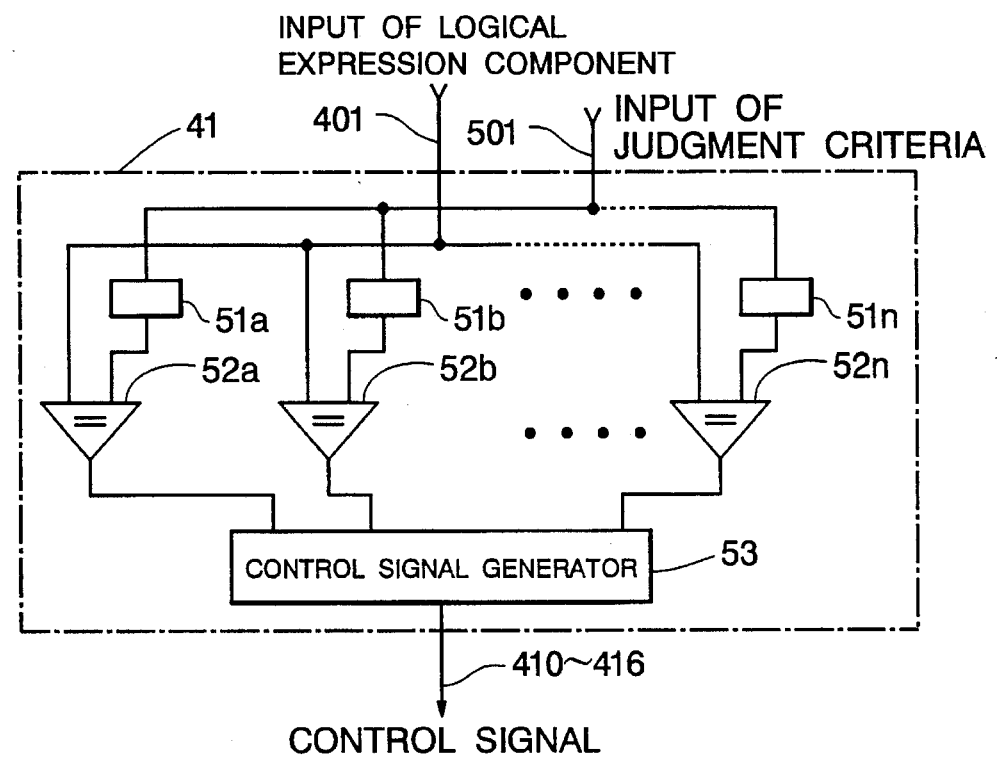

FIGS. 3(A) and 3(B) are block diagrams to show hardware configuration examples of the control unit 41. They show, in particular, preferred embodiments of the part to check the type of the component in the input logical expression.

In FIGS. 3(A) and 3(B), 51a, 51b, ... 51n are registers to store data as criteria for component type judgment of the input logical expression. In a first example of the control unit 41 shown in FIG. 3(A), though input unit for the registers 51a, 51b, ... 51n are not shown, criteria data for judgment can be set in the registers 51a, 51b, ... 51n with scan path during initialization of the device.

In a second example of the control unit 41 shown in FIG. 3(B), the criteria data can be set to the registers 51a, 51b, ... 51n using the instruction issued by the program in operation on the device via the input line 501 for criteria data. In other words, the registers 51a, 51b, ... 51n shown in FIG. 3(B) are configured as software visible registers.

For either of the control unit 41 in FIG. 3(A) or 3(B), the components of the logical expression input via the data line 401 and the criteria data at the registers 51a, 51b, ... and 51n are compared at the comparison devices 52a, 52b ... 52n. Based on the comparison results at the comparison devices 52a, 52b, ... 52n, the control signal generator 53 generates the control signals according to the control flow already shown in FIG. 2 and outputs them to the control lines 410 to 416. Thus, criteria data for judging type of logical expression components can be arbitrarily set at the registers 51a, 51b, ... 51n in the control unit 41 during system initialization using scan path, and any value can be set during operation by software instruction. Therefore, the logical expression evaluation device 40 can be initialized corresponding to the program to be executed and its function can be changed during operation.

Next, the operation of the logical expression evaluation device 40 according to this embodiment is described taking an example where it evaluates the following logical expression (1).

(1(1 v 0)(1 0))　　　　　　　　　　　　　　　　(1)

In the above logical expression (1), "v" is an OR operator and "(" and ")" specify operation levels; omitting of operator unit AND. Such a logical expression (1) is stored in the main storage 10 in the vector data format.

Figure 4:
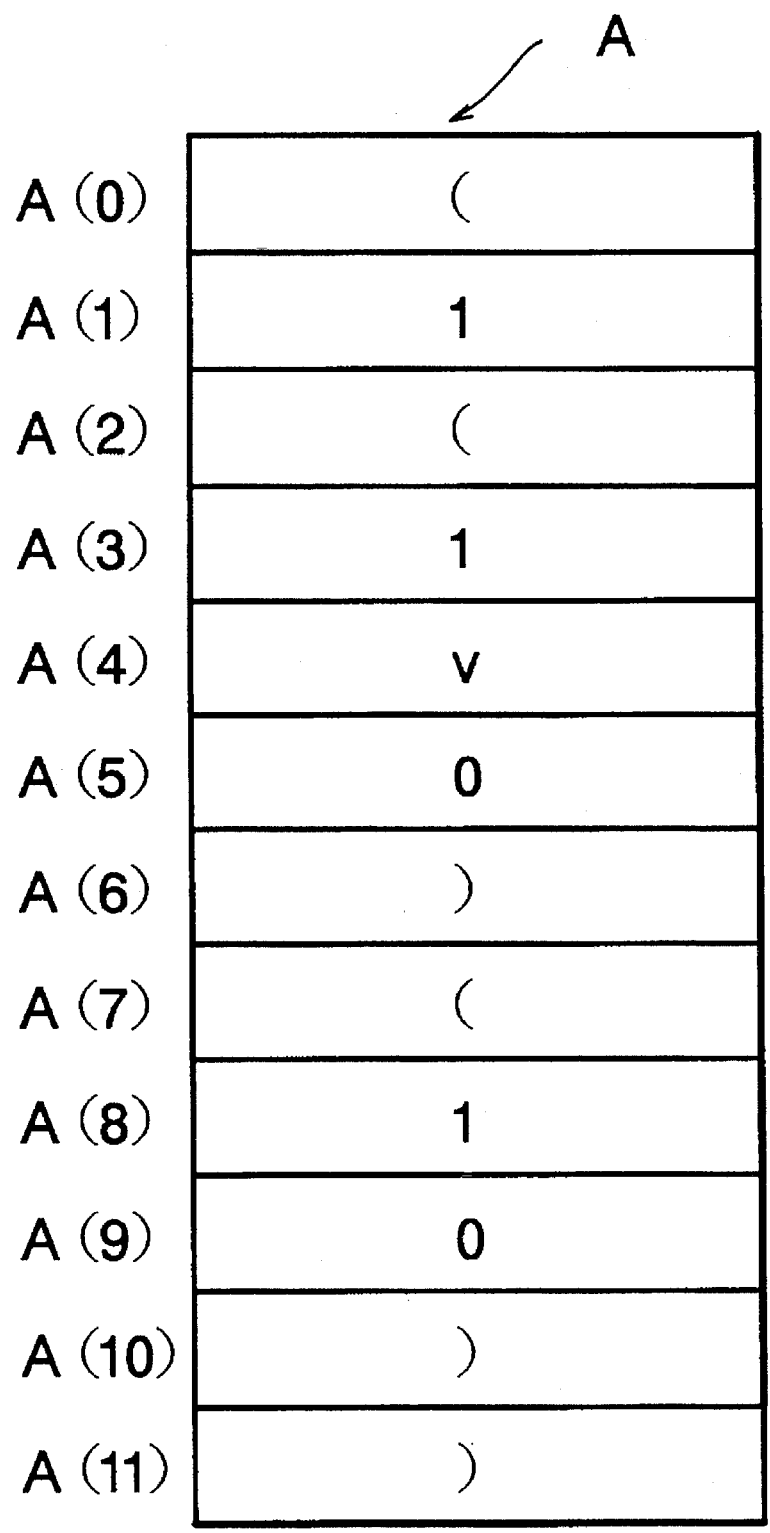
FIG. 4 is a diagram to show the configuration of vector data for a logical expression stored in a vector register.

FIG. 4 shows the configuration of vector data for the logical expression (1) stored in the vector register 30. As shown in the figure the logical expression (1) is expressed as the vector data A consisting of twelve components from vector components A(0) to A(11). The initial vector data component A(0) corresponds to the initial component of the logical expression (1), which is "(". It is in advance given a code data corresponding to "(". Similarly, the following vector components A(1) to A(11) correspond to the remaining components "1" to ")" of the logical expression (1) and each of them has a code data corresponding to the type of the component. The codes corresponding to the component type of the logical expression (1) are also set in the registers 51a, 51b, ... 51n of the control unit 41 as shown in FIG. 3A as the criteria data in advance.

In this embodiment, the device is designed so that the intermediate status setting unit 48 operates at the start of operation and the evaluation value LGEVAL="1", the operation level L ="0", skip status value F="0", and skip level M ="0", which correspond to the initial operation status, are set at the vector register 30 in advance.

When the logical expression evaluation device 40 is activated by an instruction processing section (not shown) as shown in FIG. 1, the intermediate status setting unit 48 first follows the control signal from the control unit 41 on the control line 416 and reads the above values (LGEVAL ="1", operation level L ="0", skip level M ="0") for the initial operation status from the vector register 30 through the data line 401, and sets the values "1", "0", "0" and "0" to the evaluation value holding unit 43, the operation level counting unit 44, the skip level counting unit 46 and the skip status holding unit 45 via the data lines 481 to 484.

Next, the control unit 41 starts control according to the control flow shown in FIG. 2. It reads the components of the logical expression (1) stored in the vector register 30 sequentially via the data line 401, and compares the read components with the criteria data held by the internal registers 51a, 51b, ... 51n for logical component judgment at the comparison devices 52a, 52b, ... 52n. Based on the comparison result, control signals to the components are generated at the control signal generator 53 and output to the control lines 410 to 416 in order for evaluation of the logical expression (1). Specific operation is as follows.

The first component LG(I) of the logical expression (1) input in Step S1 is "(" and the skip status value F is "0". The control unit 41 goes through Steps S2, S3 and S4 in FIG. 2 and reaches Step S8. It increases the operation level L at the operation level counting unit 44 by one to obtain "1" using the control line 413. Next, since the evaluation value LGEVAL is not "0" in Step S9, the control unit 41 proceeds to the next component processing.

The next component LG(I) is a unit element "1" and the skip status value F is "0". The control unit 41 goes through Steps S2 and S3 in FIG. 2 to proceed to Step S14. Via the control line 412, it sends necessary instructions to the evaluation value operation unit 42 and the evaluation value holding unit 43.

In response to such instruction, the evaluation value operation unit 42 ANDs LG(I) (currently having "1") output to the data line 401 and the evaluation value LGEVAL (currently having "1") output from the evaluation value holding unit 43 to the data line 431 (LGEVAL*LG(I)). The result is output to the data line 421. The evaluation value holding unit 43 holds the operation result output to the data line 421 as a new evaluation LGEVAL (currently "1").

The next component LG(I) is "(", and the skip status value F is "0". The control unit 41 goes through Steps S2, S3 and S4 in FIG. 2 and then reaches Step S8, where it increases the operation level L at the operation level counting unit 44 by one to get "2" via the control line 412. Then, in Step S9, the control unit 41 proceeds to the next component processing since the evaluation value LGEVAL is not 0.

The next component LG(I) is "1", and the skip status value F is "0". The control unit 41 goes through Steps S2 and S3 in FIG. 2 and reaches Step S14, where it sends necessary instructions to the evaluation value operation unit 42 and evaluation value holding unit 43 via the control line 412.

In response to such instruction, the evaluation value operation unit 42 ANDs LG(I) (currently "1") output to the data line 401 and the evaluation value LGEVAL (currently "1") output from the evaluation value holding unit 43 to the data line 431 (LGEVAL*LG(I)) so as to output the result to the data line 421. The evaluation value holding unit 43 holds the operation result output to the data line 421 as a new evaluation value LGEVAL (currently "1").

The next component LG(I) is an OR operator "v" and the skip status value F is "0". The control unit 41 goes through Steps S2 and S3 as in FIG. 2 and proceeds to Step S5, where it judges that the evaluation value LGEVAL output from the evaluation value holding unit 43 to the data line 431 is not "0" but "1". Here, the control unit proceeds to Step S7 and judges whether the operation level L output from the operation level counting unit 44 to the data line 441 is "0" or not.

The operation level L is now "2" and not "0". This causes the control unit 41 to execute Steps S10 and S11 and via the control lines 414 and 415, send necessary instructions to the skip level counting unit 46 and the skip status holding unit 45. This sets the skip level M at the skip level counting unit 46 to "1" and the skip status value F at the skip status holding unit 45 to "1".

In other words, since the evaluation value LGEVAL for the logical expression so far is "1" and the continuing operation is OR, the evaluation value is "1", whether the right side of the OR operator "v" or the secondary operated data is either "0" or "1". Therefore, the system sets these values so that the part in the logical expression corresponding to the secondary operated data of the OR operator "v" is skipped.

The next component LG(I) is "0", and the skip status value F is "1", which unit "skipping". The control unit 41 goes through Steps S2 and S15 and proceeds to Step S18. In Step S18, it proceeds to the next component processing since the skip level M output from the skip level counting unit 46 to the data line 461 is "1".

The next component LG(I) is ")" and the skip status value F is "1" which unit skipping. The control unit 41 goes through Steps S2 and S15 to proceed to Step S17. In Step S17, it instructs the skip level counting unit 46 to decrease the skip level M by one using the control line 414. As a result, the skip level M becomes "0". The control unit 41 detects this in next Step S18 and recognizes that the skipping is completed and then proceeds to Step S19. Thus, the control unit 41 causes the operation level L at the operation level counting unit 44 to decrease by one using the control line 413 to obtain "1". Since L is not "0" in Step S20, the control unit 41 proceeds from Step S20 to Step S21, where it resets the skip status value F at the skip status holding unit 45 to "0" using the control line 415.

The next component LG(I) is "(" and the skip status value F is "0". The control unit 41 goes through Steps S3 and S4 in FIG. 2 and proceeds to Step S8, and then via the control line 413 instructs the operation level counting unit 44 to increase the operation level L by one. In response to this, the operation level counting unit 44 increases the operation level L by one to get "2". In Step S9, since the evaluation value LGEVAL is not 0, the control unit 41 proceeds to the next component processing.

The next component LG(I) is "1", and the skip status value F is "0". The control unit 41 goes through Steps S2 and S3 in FIG. 2 and proceeds to Step S14. In Step S14, the control unit 41, via the control line 412, ANDs the component LG(I) (currently "1") output from the evaluation value operation unit 42 to the data line 401 and the evaluation value LGEVAL (currently "1") output from the evaluation value holding unit 43 to the data line 431 (LGEVAL*LG(I)). Then, the operation result output to the data line 412 is held at the evaluation value holding unit 43 as a new evaluation value LGEVAL (currently "1").

The next component LG(I) is "0", and the skip status value F is "0". The control unit 41 goes through Steps S2 and S3 and proceeds to Step S14. In Step S14, the control unit 41, via the control line 412, ANDs the component LG(I) (currently "1") output from the evaluation value operation unit 42 to the data line 401 and the evaluation value LGEVAL (currently "1") output from the evaluation value holding unit 43 to the data line 431 (LGEVAL*LG(I)). Then, the operation result output to the data line 412 is held at the evaluation value holding unit 43 as a new evaluation value LGEVAL (currently "0").

The next component LG(I) is ")" and the skip status value F is "0". The control unit 41 goes through Steps S3 and S4 and proceeds to Step S12. Using control signal via the control line 413, it decreases the operation level L at the operation level counting unit 44 by one to get "1". Then, in Step S13, the control unit proceeds to the next component processing since the logical level L is not 0.

The next component LG(I) is again ")", and the skip status value F is "0". The control unit 41 goes through Steps S3 and S4 and proceeds to Step S12. Using control signal via the control line 413, it decreases the operation level L at the operation level counting unit 44 by one to get "0". Then, in Step S13, the control unit terminates the evaluation of the logical expression (1) since the operation level L becomes "0".

Upon completing evaluation of logical expression (1), the control unit 41, via the control line 411, instructs the intermediate status storing unit 47 to store the intermediate status value and at the same time outputs the control signal required for that storing to the vector register 30 via the control line 410. Upon receipt of such instruction, the intermediate status storing unit 47 stores the data on the data lines 431, 441, 461 and 451 as intermediate status values (final evaluation values in this case) to the vector register 30. In the above example, the evaluation value LGEVAL of the logical expression (1) is "0" and this is stored in the vector register 30. This completes the entire evaluation operation.

Thus, the logical expression evaluation device 40 in this embodiment treats a logical expression as vector data and continuously processes it on hardware configuration in order for high-speed evaluation of a logical expression. The evaluation device according to this embodiment is capable of such processing at a speed seven times that in conventional software processing for logical expressions with a length of about 30. When the logical expression to be evaluated is longer and about 100, for example, the effect of the invention becomes more remarkable. It attains a speed 15 to 20 times the conventional speed.

As described above, this invention enables logical expression evaluation at a greatly higher speed than the speed obtained in conventional software processing with scalar process, because it treats the logical expression as vector data, continuously reads the logical expression in vector data format stored in the vector register for continuous processing on hardware.

Figure 5:
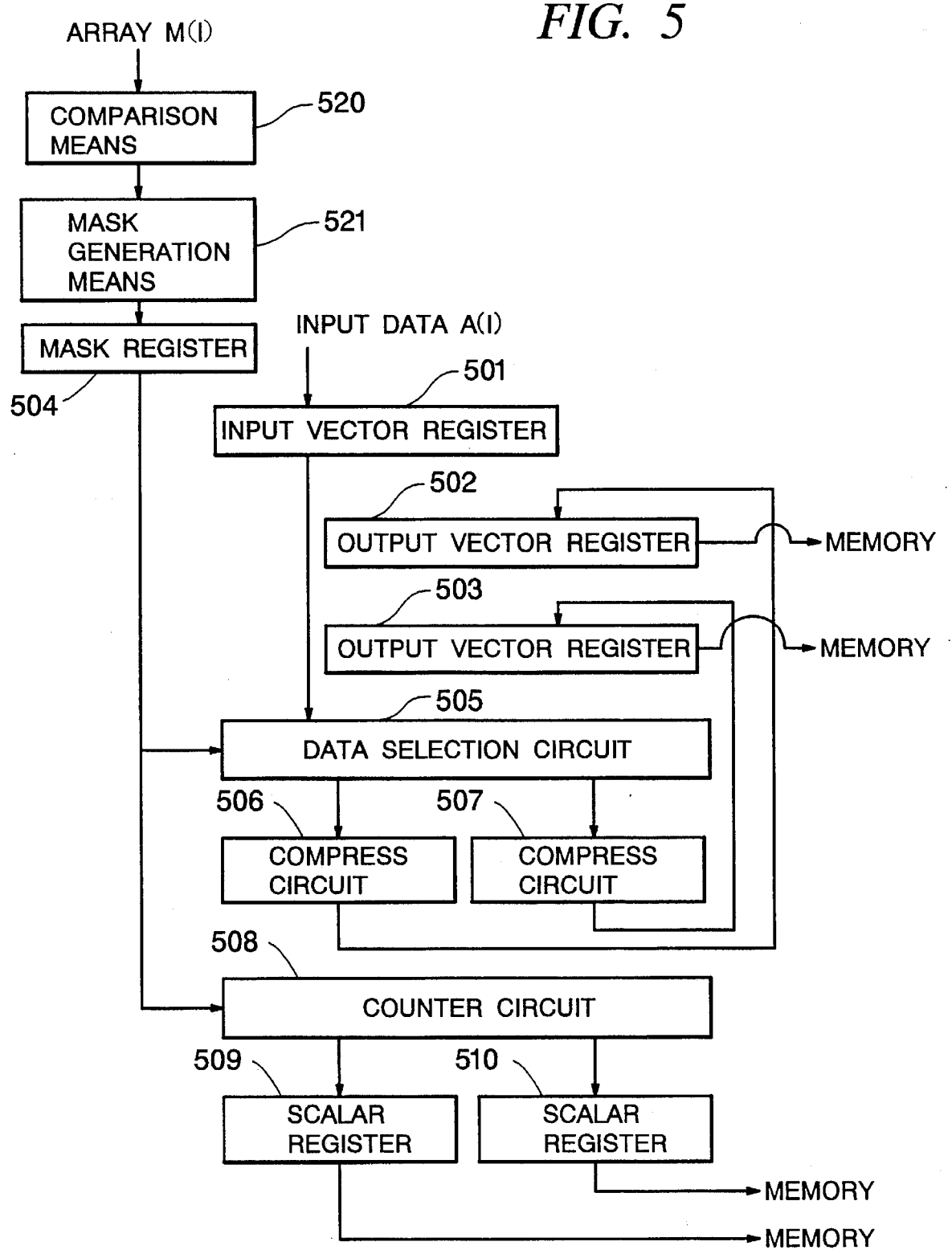
FIG. 5 is a block diagram to show the configuration of a vector operation device according to an embodiment of the present invention.

Now, a preferred embodiment of a vector operation device according to the present invention is described with referring to attached figures. FIG. 5 is a block diagram to show the configuration of a vector operation device according to an embodiment of the present invention.

A vector operation device according to the present invention comprises an input vector register 501, output vector registers 502 and 503, a mask register 504, a data selection circuit 505, compress circuits 506 and 507, a counter circuit 508, scalar registers 509 and 510, a comparison unit 520 and a mask generation unit 521.

The input vector register 501 stores input operand data for a number corresponding to the vector length. In an example of FIG. 8, the input operand data is shown as the array A (I). The output vector registers 502 and 503 store the output vector data for a number corresponding to the length of vector. In the example of FIG. 8, the output vector data is the data to be stored in the arrays B and C at the time of processing termination. The mask register 504 is to hold the data for conditional vector operation control and holds 1-bit data ("0" or "1") for the number equal to the vector length. Usually, the i'th bit data on the mask register 504 is used to control the processing for the i'th data in the input vector register 501.

The data selection circuit 505 receives one component of data per clock from the input vector register 501 and the mask register 504. The data received from the input vector register 501 is sent to the compress circuit 506 when the bit data received from the mask register 504 is "1", and to the compress circuit 507 when the bit data received from the mask register 504 is "0". The compress circuit 506 sends the data received from the data selection circuit 505 to the output vector register 502 and controls the received data so that they are continuously stored in the output vector register 502. The compress circuit 507 sends the data received from the data selection circuit 505 to the output vector register 503, and controls the received data so that they are continuously stored in the output vector register 503.

The counting circuit 508 counts the number of "0"s or "1"s on the mask register in order to determine the vector length for storing vector data classified on the output vector registers 502 and 503 onto the memory (main memory or others). Specifically, it receives one bit data per clock from the mask register 504 and counts how many times the bit data it receives has the value "1" and stores the count value at the scalar register 509; at the same time, it also counts how many times it receives the bit data having the value "0" and the count value is stored in the scalar register 510. This counting procedure at the counting circuit 508 is executed at the same time as the data selection by the data selection circuit 505 and the processing by the compress circuits 506 and 507.

Figure 6:
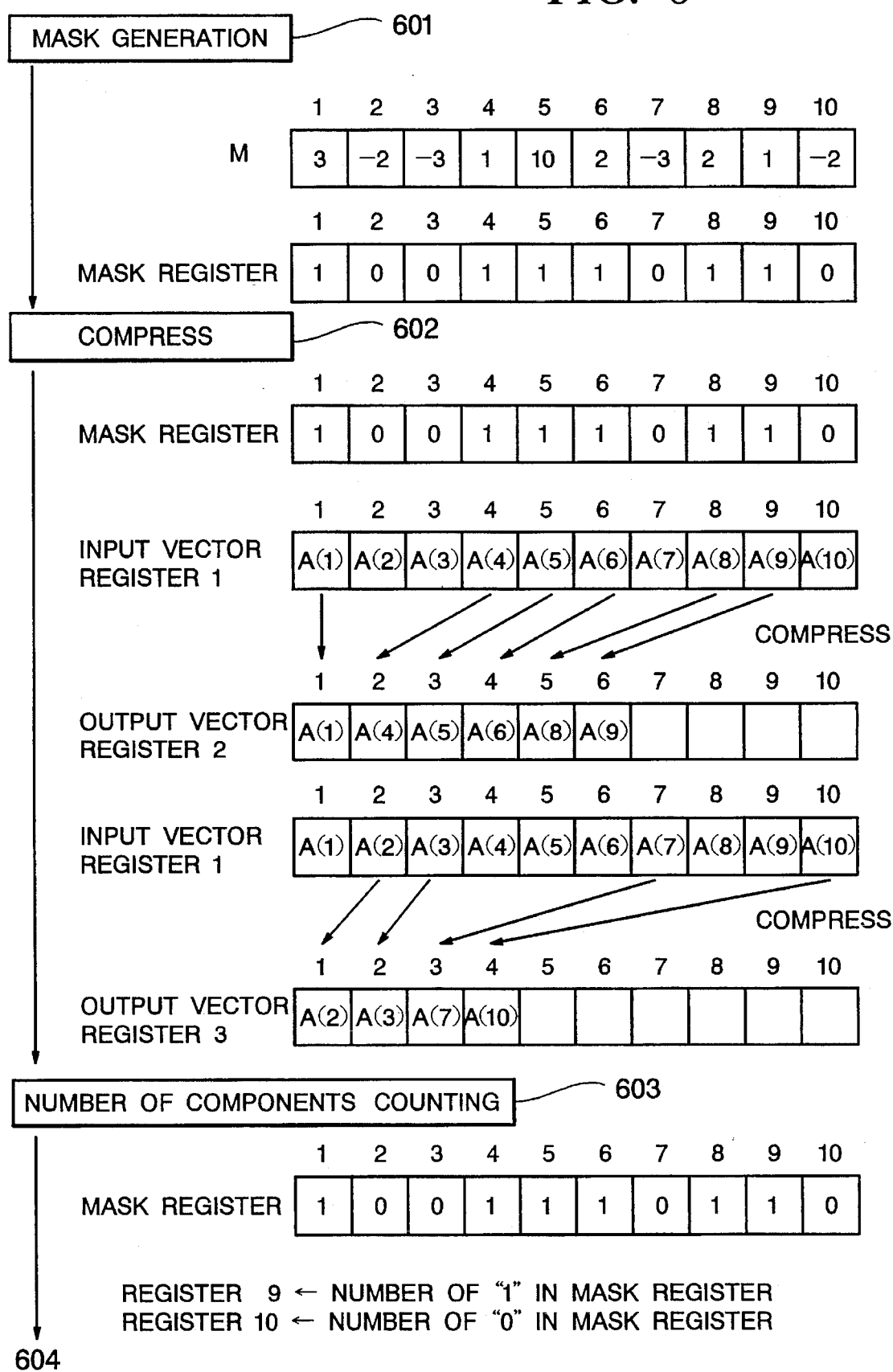
FIG. 6 is a flowchart to show the processing procedure according to the embodiment of the present invention as shown in FIG. 5.
Figure 7:
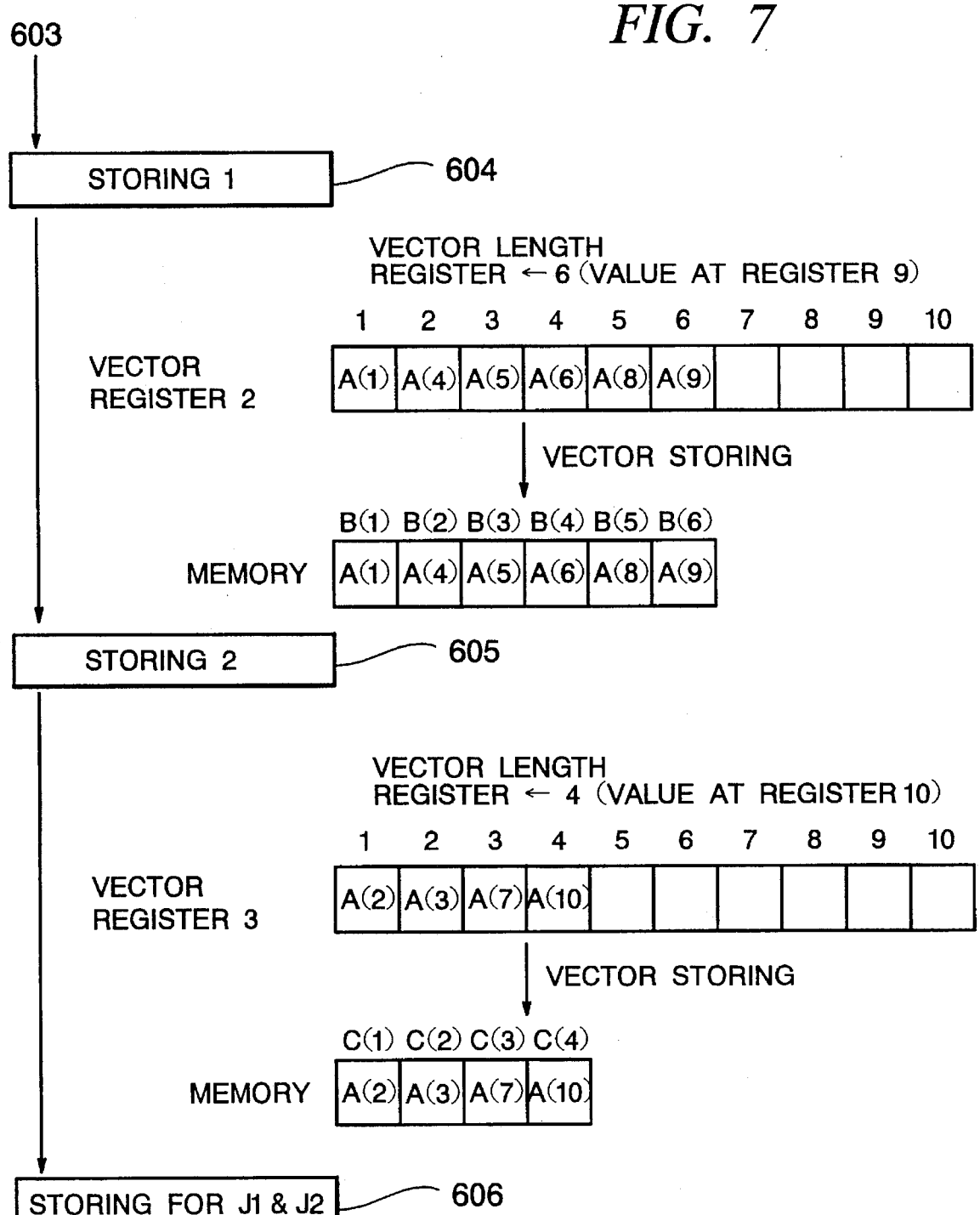
FIG. 7 is a flowchart to show the processing procedure according to the embodiment of the present invention as shown in FIG. 5.
Figure 9:
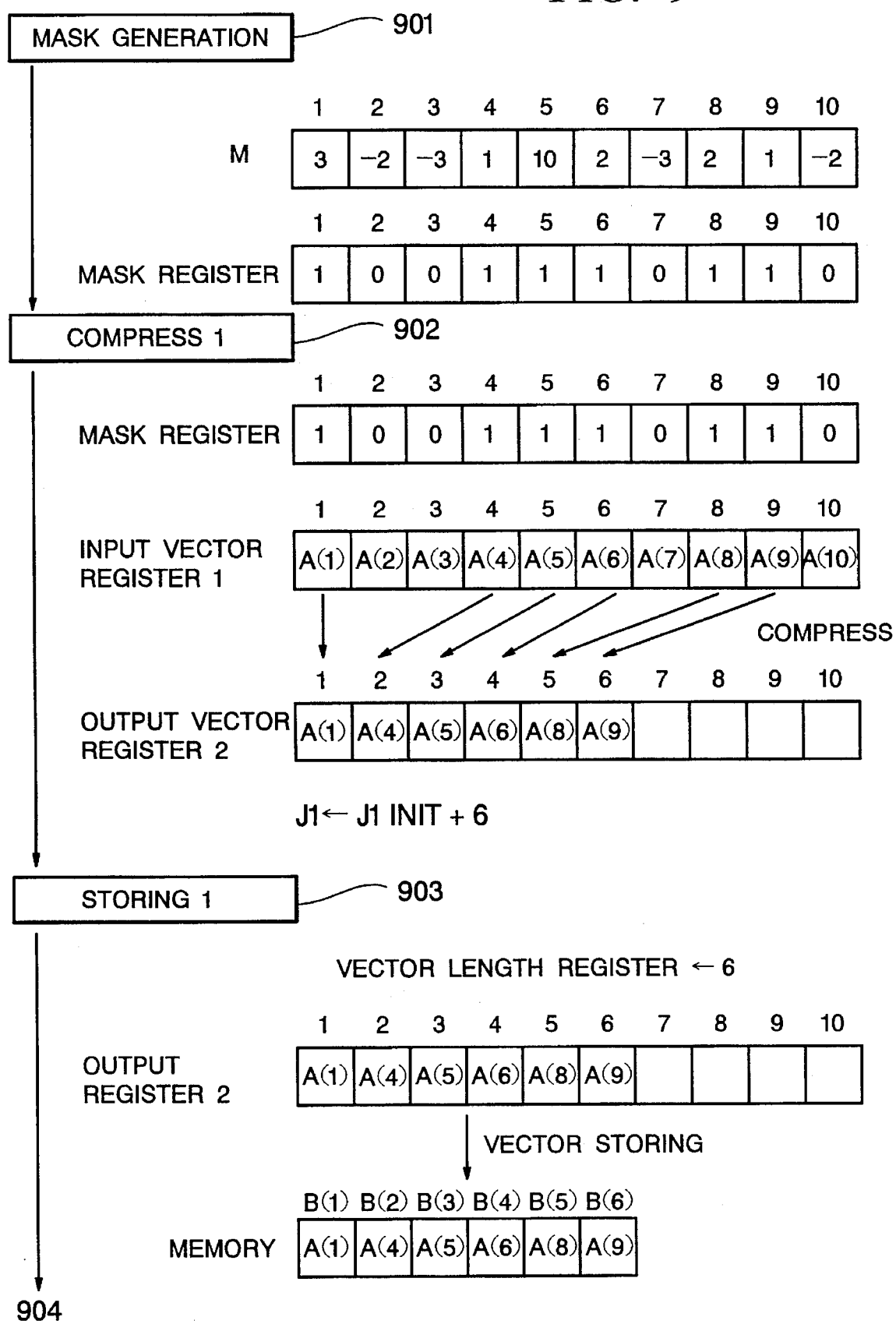
FIG. 9 is a flowchart to show the processing procedure used in a conventional vector operation.
Figure 10:
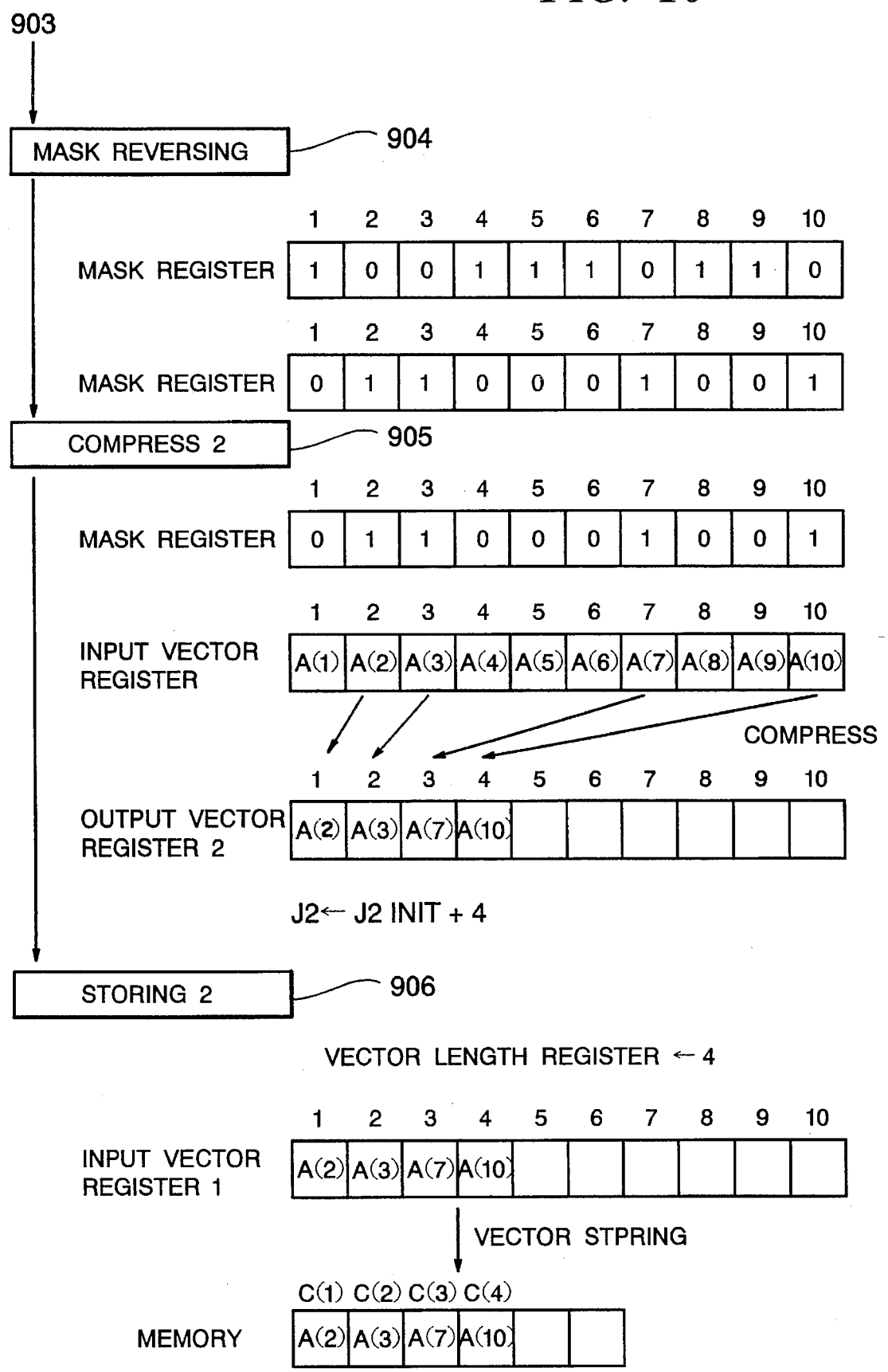
FIG. 10 is a flowchart to show a conventional vector operation processing procedure.

Referring now to FIGS. 5, 6 and 7, the classification processing as shown in FIG. 8 by the vector operation device according to the present invention is described.

Initial conditions are supposed to be as follows: The variable N for vector length holding is 10 and the arrays are M(1)=3, M(2)=−2, M(3)=−3, M(4)=1, M(5)=10, M(6)=2, M(7)=−3, M(8)=2, M(9)=1 and M(10)=−2.

The array A(I), which is the input operand data, is loaded to the input vector register 501 and the value of A(I) is supposed to be stored as the first component of the input vector register 501.

Mask generation 601

Each component of the comparison array M is compared with "0". At the corresponding component number location on the mask register 504, "1" is stored when the component is larger than "0" and "0" is stored in other cases. This can be realized by loading, vector comparison and mask generation instructions of the array M.

Compress 602

Then, one component of array A stored in the input vector register 501 and one bit data stored in the mask register 504 are sent to the data selecting circuit 505. The data selection circuit 505 sends the data received from the input vector register 501, to the compress circuit 506 if the sent bit data is "1" and to the compress circuit 507 if the bit data is "0". The compress circuit 506 sends the data received from the data selection circuit 505 to the output vector register 502. The compress circuit 507 sends the data received from the data selection circuit 505 to the output vector register 503.

The compress circuits 506 and 507 control the output vector registers 502 and 503 so that the data received from the data selection circuit 505 are sequentially stored in order on the output vector registers 502 and 503.

This control can be realized, for example, by provision of a vector register control counter at the compress circuits 506 and 507. Such a counter counts and holds the data location on the register for next writing at the output vector registers 502 and 503. Specifically, a counter for vector register control at the compress circuits 506 and 507 increments by one and holds the data location only when a data is sent from the data selection circuit 505 and at the time of data sending, sends to the output vector registers 502 and 503 the write location for them. Alternatively, if the device has a counter circuit 508 as in this embodiment, the above counter for vector register control and the counter circuit 508 can be the same circuit. The processing shown as above causes data generation at the output vector registers 502 and 503.

Number of components counting 603

In a vector operation device provided with a counter circuit 508, at the same time as the processing above, i.e. sending of mask data components one by one from the mask register 504 to the data selecting circuit 505, the same mask data is sent to the counter circuit 508, too. The counter circuit 508 counts the number of data having the value "1" and of the data having the value "0" among those sent from the data selection circuit 505. When the number of sent data reaches the number corresponding to the vector length N, the counter circuit 508 stores these count values at the scalar registers 509 and 510 respectively.

In case of a vector operation device not provided with a counter circuit 508, the effective vector length for the output vector register 502 is determined by unit of a vector instruction to count the number of data having the value "1" among those on the mask register. By subtracting the above effective vector length for the output vector register 502 from the value at the register holding the value of the effective vector length N for the input vector register 1, the effective vector length for the output vector register 503 is determined. With these two effective vector lengths thus determined being stored at the scalar registers 509 and 510, the processing as in the above vector device can be performed.

Storing to memory 604, 605

The data on the vector register 2 are vector stored using the value at the scalar register 509 as the vector length and the initial address of the array B as the memory position for starting storing. The data on the vector register 3 are vector stored with using the value at the register 10 as the vector length and the initial address of the array C as the memory location for starting storing.

Storing for memory addresses J1 and J2 606

Finally, the value at the scalar register 509 and the value for J1INIT are summed and the result is stored at the address J1. The value at the scalar register 510 and the value for L2INIT are summed and the result is stored at the address J2. Thus, the processing as shown in FIG. 8 is completed. As shown above, this vector operation device enables simultaneous processing of THEN clause and ELSE clause in particle classification procedure in a form as shown in FIG. 8.

However, when the vector length N exceeds the maximum vector length that can be vector processed, the vector in question needs to be divided into a plurality pieces having a length not more than the maximum vector length and processed in a plurality of operations.

The vector operation device of the present invention simultaneously makes two compress steps for data obtained by selection from vector data, and thereby eliminates the need of mask reversing processing required in conventional system. Since two separate compress steps in conventional system are reduced to one step, compressing can be completed at a speed twice the speed in conventional system. In addition, though a conventional system requires two steps for counting the number of components, this embodiment with a counter circuit 508 can execute this process at the same time as the above compress step, which results in higher speed processing.

Obviously many modifications and variations of the present invention are possible. It is intended to cover in the appended claims all such modifications as fall within the true spirit and scope of the invention.

What is claimed is:

1. A logical expression evaluation device, comprising:
    a logical expression storing means for storing a logical expression having components in a vector data format;
    an evaluation value operation means coupled to the logical expression storing means for processing intermediate evaluation values of said logical expression and a logical means element as a component of said logical expression;
    an evaluation value holding means coupled to the evaluation value operation means for holding an operation result obtained by said evaluation value operation means as an intermediate evaluation value of the logical expression;
    an operation level counting means for counting a nesting depth of said logical expression under evaluation;
    a skip status holding means for setting a part of the logical expression which corresponds to secondary operated data of a particular operator in said logical expression to a skip status;
    a skip level counting means for counting a nesting depth of said logical expression in the skip status; and
    a control means connected to the logical expression storing means, the evaluation value operation means, the evaluation value holding means, the operation level counting means, the skip status holding means and the skip level counting means, for sequentially reading out the components of said logical expression, judging a type of the read component and controlling the logical expression storing means, evaluation value operation means, evaluation value holding means, operation level counting means, skip status holding means and skip level counting means based on the judgment result and the status of the logical expression storing means, evaluation value operation means, evaluation value holding means, operation level counting means, skip status holding means and skip level counting means, and for evaluating said logical expression and omitting the operation by said evaluation value operation means for the part of the logical expression corresponding to the secondary operated data of said particular operator.

2. A logical expression evaluation device of claim 1, further comprising:
    an intermediate status storage means for storing, upon completion of evaluation for a certain part of said logical expression, the intermediate evaluation value of said logical expression held at said evaluation value holding means, operation level information at said operation level counting means, skip status information at said skip status holding means and skip level information at said skip level counting means to said logical expression storing means; and
    an intermediate status setting means for, when resuming the evaluation, reading out and setting the intermediate evaluation value, operation level information, skip status information and skip level information respectively to said evaluation value holding means, said operation level counting means, said skip status holding means and said skip level counting means.

3. A logical expression evaluation device of claim 1, wherein said control means further comprises:
    a means for holding criteria data used in judging the types of components of said logical expression; and
    a means for comparing the read out components of said logical expression with said criteria data.

4. A logical expression evaluation device of claim 3 wherein said means to hold criteria data in the control means sets arbitrary criteria data through a scan path or software instruction.

5. A logical expression evaluation device of claim 1, wherein when said skip status holding means has skip information indicating a non-skip status said control means outputs:
    a control signal to cause the operation by said evaluation value operation means with a result to be stored to said evaluation value holding means for a case where the read out component of said logical expression is a logical means element "0" or "1";
    a control signal to set an intermediate value of said evaluation value holding means to "1" if the intermediate evaluation value is "0" for a case where the component of said logical expression is an OR operation;
    a control signal to increment or decrement the count at said operation level counting means for a case where the component of said logical expression indicates a logical level; and
    a control signal to set the skip information at the skip status holding means and increment the count at the skip level counting means if the intermediate evaluation value at said evaluation value holding means is "0"; and wherein when said skip status holding means has skip information indicating a skip status, said control means outputs:
    a control signal to increment or decrement the count at the skip level counting means for a case where the component of said logical expression indicates a logical level;
    a control signal to decrement the count at said operation level counting means if the skip level at the skip level counting means is not "0"; and
    a control signal to set the information at the skip status holding means to the non-skip status if the count at said operation level counting means is not "0".

6. A vector operation device comprising:
    an input data storing means for holding vector data including a plurality of vector data elements as input operand data;
    a mask data storing means for holding mask data including a plurality of mask bits for vector operation control of said vector data;

a data selecting means for reading one vector data element of the vector data held at said input data storing means and one mask bit, corresponding to the read vector data element, of the data held at said mask data storing means at a time and outputting the read vector data element as first output data if the mask bit from said mask data storing means has a logical value "1", and as second output data if the mask bit from said mask data storing means has a logical value "0";

a first output data storing means for holding said first output data;

a second output data storing means for holding said second output data;

a first compress means connected between said data selecting means and said first output data storing means for receiving the first output data from said data selecting means and sequentially storing said first output data to said first output data storing means; and a second compress means connected between said data selecting means and said second output data storing means for receiving the second output data from said data selecting means and sequentially storing said second output data to said second output data storing means, the second compress means storing the second output data to the second output data storing means in parallel with the first compress means storing corresponding first output data to the first output data storing means.

7. A vector operation device of claim 6 wherein said first and second compress means have data location counting means for sequentially counting a location for writing of said first and second output data to said first and second output data storing means.

8. A vector operation device comprising:

an input data storing means for holding vector data including a plurality of vector data elements as input operand data;

a mask data storing means for holding a plurality of mask bits to control vector operation for said vector data;

a data selecting means for reading one of the vector data elements held at said input data storing means and one of the mask bits held at said mask data storing means at a time and outputting the vector data elements as first output data if the mask bit from said mask data storing means has a logical value "1", and as second output data if the mask bit from said mask data storing means has a logical value "0";

a first output data storing means for holding said first output data;

a second output data storing means for holding said second output data;

a first compress means for receiving the first output data from said data selecting means and sequentially storing said first output data to said first output data storing means;

a second compress means for receiving the second output data from said data selecting means and sequentially storing said second output data to said second output data storing means;

means provided at said first and second compress means to count locations for writing of said first and second output data to said first and second output data storing means, respectively;

a first counting means for counting the number of times data at said mask data storing means is "1";

a second counting means for counting the number of times the data at said mask data storing means is "0";

a first storing means for storing the count value of said first counting means; and a second storing means for storing the count value of said second counting means.

9. A vector operation device comprising:

an input data storing means for holding vector data including a plurality of vector data elements as input operand data;

a mask data storing means for holding mask data including a plurality of mask bits for vector operation control of said vector data;

a data selecting means for reading one vector data element of the vector data held at said input data storing means and one mask bit, corresponding to the read vector data element, of the mask data held at said mask data storing means at a time and outputting the read vector data element as first output data if the mask bit from said mask data storing means has a logical value "1", and as second output data if the mask bit from said mask data storing means has a logical value "0";

a first output data storing means for holding said first output data;

a second output data storing means for holding said second output data;

a first compress means for receiving the first output data from said data selecting means and sequentially storing said first output data to said first output data storing means; and a second compress means for receiving the second output data from said data selecting means and sequentially storing said second output data to said second output data storing means, wherein said first and second compress means have data location counting means for sequentially counting a location for writing said first and second output data to said first and second output data storing means, respectively, the data location counting means incrementing the data writing location by one each time the data location counting means receive said first and second output data from said data selecting means.

10. A vector operation device comprising:

an input data storing means for holding vector data including a plurality of vector data elements as input operand data;

a mask data storing means for holding mask data including a plurality of mask bits for vector operation control of said vector data;

a data selecting means for reading one vector data element of the vector data held at said input data storing means and one mask bit corresponding to the read vector data element of the mask data held at said mask data storing means at a time and outputting the read vector data element as first output data if the mask bit from said mask data storing means has a logical value "1", and as second output data if the mask bit from said mask data storing means has a logical value "0";

a first output data storing means for holding said first output data;

a second output data storing means for holding said second output data;

a first compress means for receiving the first output data from said data selecting means and sequentially storing said first output data to said first output data storing means;

a second compress means for receiving the second output data from said data selecting means and sequentially storing said second output data to said second output data storing means;

a first counting means for counting how many times the mask bit read from said mask data storing means is "1"; and second counting means for counting how many times the mask bit read from said mask data storing means is "0".

11. A vector operation device of claim 10 further comprising a first storing means to store the count value of said first counting means and a second storing means to store the count value of said second counting means.

* * * * *